R. L. STINCHFIELD.
COLOR PHOTOGRAPHY.
APPLICATION FILED JULY 19, 1919.
1,364,958.
Patented Jan. 11, 1921.
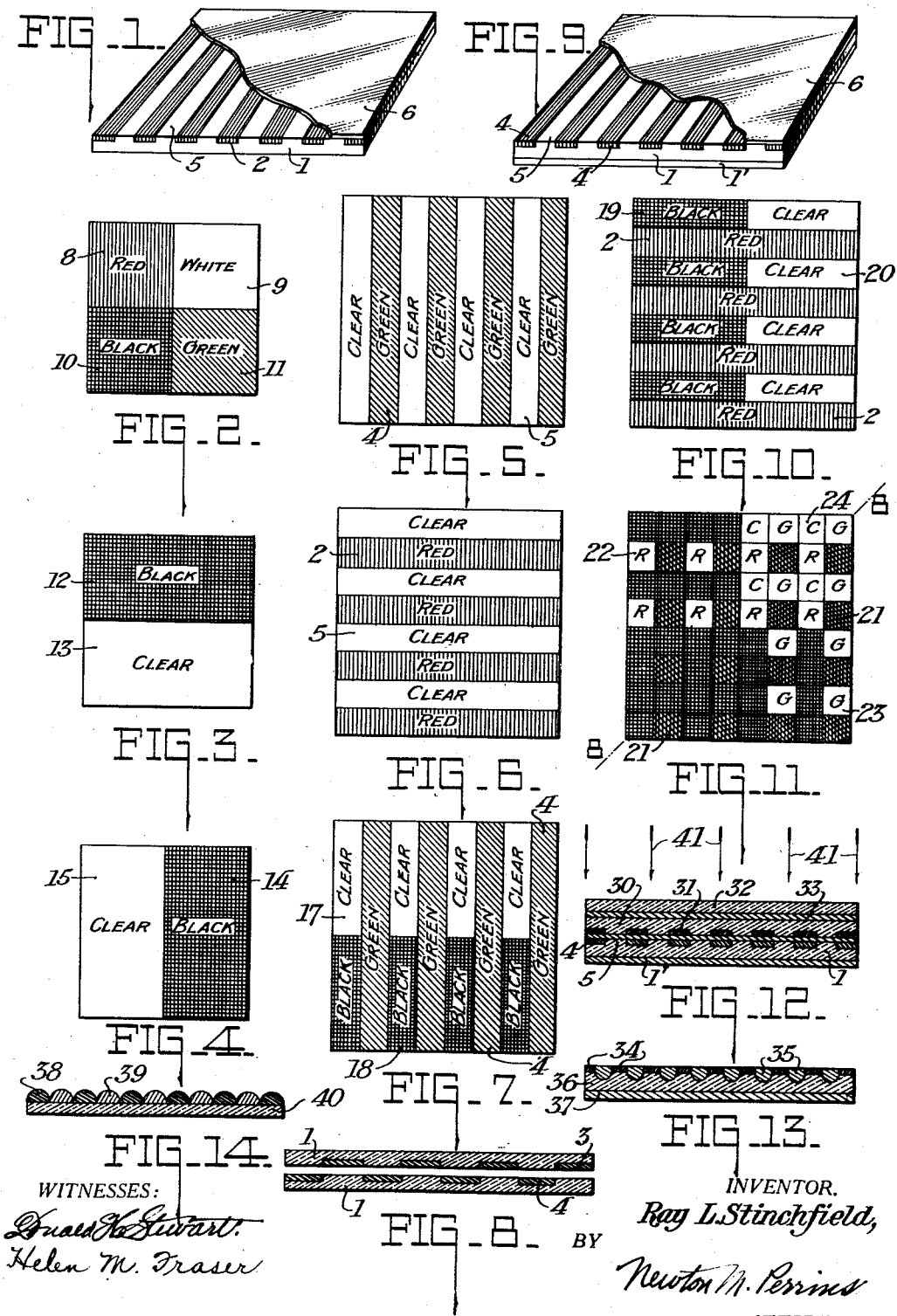

UNITED STATES PATENT OFFICE.

RAY L. STINCHFIELD, OF ROCHESTER, NEW YORK, ASSIGNOR TO EASTMAN KODAK COMPANY, OF ROCHESTER, NEW YORK, A CORPORATION OF NEW YORK.

COLOR PHOTOGRAPHY.

1,364,958.  Specification of Letters Patent.  Patented Jan. 11, 1921.

Application filed July 19, 1919. Serial No. 312,052.

*To all whom it may concern:*

Be it known that I, RAY L. STINCHFIELD, citizen of the United States of America, residing at Rochester, in the county of Monroe and State of New York, have invented certain new and useful Improvements in Color Photography, of which the following is a full, clear, and exact specification.

My invention relates to color photography and more particularly to photographic elements and processes of using such elements in recording the color value images of a given subject and to the finished photographs in color resulting from such process.

One object of my invention is to provide a photographic element and process which will require from the operator a knowledge of only the ordinary photographic operations. Another object is to provide a process by means of which any number of color photographs may be prepared from an original set of color selection negatives. A further object is to provide a process, the steps of which are under easy control both when making the negative and when making the color pictures therefrom. A further object is to provide elements for use in the process which are simple, inexpensive to manufacture and are easily registered during assembling of the final color photograph. A further object is to provide a finished photographic print with a reflecting backing, in other words, a colored photograph which is visible by reflection. Further objects will hereinafter appear.

The invention is based upon the three-color theory of vision according to which any color may be reproduced by mixing three fundamental colors. In practice it has been found that the use of only two such colors will satisfactorily reproduce certain subjects, such as portraits. Accordingly I shall, for clearness, direct this description to the two-color system.

If, for example, a red picture be made in which the redness of each part is in proportion to the red light reflected from the corresponding part of the original subject, and if a green picture be made in which the greenness of each part is in proportion to the green light reflected from the corresponding part of the original subject and further if these red and green pictures be properly combined, then the resulting combination will give a satisfactory color reproduction.

One way of combining them is to divide the red and green pictures into very small areas and then properly juxtapose and intersperse such areas. For instance, a white object which reflects both red and green light, will show red in the red picture and green in the green picture. In the final or combined photograph that object will be represented by a mass of interspersed areas of red and green which are small enough to be individually indistinguishable when looked at from the desired viewing distance; yet each area sends its share of colored light to the observer's eye, and the sum of the red and green lights thus sent to the eye produces the effect of white light. I combine the red and green pictures by interspersing the tiny areas, but in doing so utilize two easily assembled blanks or elements, one of which is provided with an opaque reflecting backing, as will now be described.

Referring to the accompanying drawing:

Figure 1 is a perspective view, on an enlarged scale, of a portion of one of my photographically sensitive elements, showing the coating partially broken away;

Fig. 2 is a convenient test chart or subject made up of colored and black and white squares;

Fig. 3 represents a negative obtained by photographing the subject shown in Fig. 2 through a filter capable of transmitting mainly the red rays of light on to a panchromatic or suitable red sensitive photographic element;

Fig. 4 represents similarly the negative obtained by photographing the chart of Fig. 2 through a green filter on to a green sensitive or a panchromatic plate;

Fig. 5 is a face view, on an enlarged scale, of a green lined element, the sensitive layer being omitted for clearness;

Fig. 6 is a similar face view, on an enlarged scale, of a red lined element;

Fig. 7 is a face view, on an enlarged scale, of a positive print made on a green lined element from the red color value negative shown in Fig. 3.

Fig. 8 is a diagrammatic section, on an enlarged scale, on the line 8—8 of Fig. 10, of two elements superposed but without the image bearing layers or the reflecting opaque layer;

Fig. 9 is a perspective view, on an enlarged scale, of a portion of one of my photographically sensitive elements which embodies an opaque reflecting backing, part of the sensitive layer being broken away for clearness.

Fig. 10 shows diagrammatically a face view, on an enlarged scale, of a positive print on my red lined element from the green selection negative shown in Fig. 4;

Fig. 11 is a diagrammatic showing, on an enlarged scale, of a reproduction of the chart of Fig. 2 formed by superposing the positive prints of Figs. 7 and 10;

Fig. 12 is a cross section, on an enlarged scale, indicating diagrammatically the method of printing on to the element shown in Fig. 9;

Figs. 13 and 14 are cross sectional diagrams, on an enlarged scale, of modified forms of the element which is provided with a reflecting backing.

Referring now to the drawing in detail, two color-selection negatives are made, for example, red and green, of the chart shown in Fig. 2. This chart may conveniently be composed of red area 8, white area 9, green area 11 and black area 10. Said negatives are made by photographing on to suitable color sensitive plates, one through a filter which lets by principally red light and a second through a filter which transmits chiefly green light. When the plates are developed, the red selection negative will be black, as indicated at 12 in Fig. 3, where it has been affected by red light both from area 8 and area 9 of the chart. The rest of the negative will be clear as indicated at 13. The green light from areas 9 and 11 fails to appreciably pass the red filter. Similarly the green light negative will be darkened, as indicated at 14 in Fig. 4, with a corresponding clear space at 15, the latter resulting from the fact that no light reached the plate from the red area 8 or the black area 10.

These negatives coact with the blanks or elements in the production of the red and green positive images. The element which occupies the upper position or the position nearest the observer's eye when viewing the finished print, is shown in Fig. 1. It comprises any suitable translucid support 1, such as glass, or celluloid, clear or translucent, upon one face of which are located spaced color filter elements, for example, parallel lines 2. Between these lines are the clear spaces or windows 5. In the preferred form of my invention the filters 2 on a given element are all of the same color. As illustrated in the drawing, the windows 5 may be and are preferably of the same order of magnitude as the filter elements 2. It is necessary that the clear spaces or windows 5 bear sensitive photographic elements, and it is immaterial whether there be any photographic elements or emulsion above the filter lines 2. But, because of convenience in manufacture in the preferred form of my invention, a continuous photographic sensitive layer 6 is spread over the filters 2 as well as over windows 5. While I have illustrated the color filters and the windows as integral with the support 1, they are, nevertheless, both in location and function distinct from such a support and are separate elements of the invention. It will further be seen that the printing portions or areas of the sensitive layer 6, which are above the windows or clear elements 5, are alternated with the color filters or elements 2 when considered with respect to the light used in viewing or printing the element. While the sensitive areas above the clear spaces 5 are not shown in exactly the same plane as the color filters 2, they are contiguous to a common plane and are interspersed for practical purposes in performing their functions.

The lower element, that is the one which is farthest from the observer's eye when viewing the finished picture, is shown in Fig. 9. It is similar to the element shown in Fig. 1 except that the filter lines or areas 4 are of a color adapted to coöperate with the different color of the lines 2; and the element embodies an opaque reflecting backing 1', such as a paper or a metallic layer having a reflecting surface, either glossy or matte. In the preferred embodiment, I employ paper with a white baryta coating in contact with the part 1. For special effects the surface of element 1' may be selectively reflecting, for instance, in portraiture it may have a slight bluish absorption, thus appearing yellowish to the eye.

The red selection negative shown in Fig. 3 is printed on to the lower element (Fig. 9) which in the illustration has green filter lines. The result is indicated diagrammatically in Fig. 7, where the blackened spaces are indicated at 18, the clear lines at 17 and the green lines at 4. In order to prevent the printing light from reaching the sensitive emulsion above the filter lines 4, I use an auxiliary screen, as indicated in Fig. 12. This screen embodies a transparent plate 30, bearing masking lines 31 substantially coextensive with the lines 4 on the lower element. Lines 31 are opaque with respect to the printing light. The negative indicated in Fig. 12 at 32 has its image bearing layer at 33 and is directly superposed upon the auxiliary screen. To avoid parallax, substantially parallel light rays are used during printing. Due to the shielding effect of the lines 31, the photographic sensitive emulsion above the filter lines becomes transparent after developing, fixing, etc. This is clearly indicated in Fig. 7. In Fig. 12, arrows 41 indicate the direction of the printing light. Similarly the green selection negative indicated in Fig. 4 is printed upon the red line element of Figs. 1 and 6. In the case of this upper element an auxiliary screen may be used when printing, using the arrangement shown in Fig. 12. As an alternative, the element shown in Fig. 1 may be printed from the back, advantage being taken of the fact that filter lines 2 can act as printing masks as well as viewing filters, the latter indicating, of course, their main function. The sensitive layers 6 may be composed of any ordinary positive emulsion which is almost wholly sensitive to blue light only. Experience has shown that either red or green filter lines will substantially shield an ordinary positive emulsion located on them, so that the latter will not be fogged during the printing operation. Of course, the emulsion 6 might be one specially sensitized to light of a color complementary to that passed by the filter lines, in which case the printing light would be of such complementary color. The resulting positive indicated in Fig. 10 shows black areas 19 corresponding to clear area 15 of Fig. 4, the clear areas 20 corresponding to black area 14 in Fig. 4. The red lines are shown at 2.

The green lined positive of Fig. 7 is finally superposed upon the red lined positive of Fig. 10, giving the result shown diagrammatically in Fig. 11, which represents the chart of Fig. 2. Wherever the red and green filters cross each other a black area 21 results. Green light cannot get past the red filter nor can red light pass the green filter, and wherever there is a black area in either positive the final picture is black. In consequence there is a blotting out of all areas except those of the appropriate color. The red area 8 of the chart is represented in the final picture of Fig. 11 by red filter elements 22 which are closely juxtaposed. The green area 11 of the chart is represented by the green filter elements 23. The white section 9 of the chart is represented by a mixture of red and green filter areas and clear spaces 24, the sum of such red, green and clear spaces appearing white when blended at the proper viewing distance. In fact, the little squares or areas of color are indistinguishable when the print is at a suitable distance and the chart appears to be reproduced in uniform tints or tones.

The final reproduction of the chart will be a color reflecting print as distinguished from a transparency. The light passes downward or in a direction away from the observer through the little filter areas 22, 23 and clear spaces 24 to the reflecting surface of the opaque backing 1'. From thence it is reflected up through such color elements and spaces to the eye of the observer. Such colored reflecting prints may be broadly classed with ordinary photographic paper prints as distinguished from window transparencies, or lantern slides, which are ordinarily viewed by transmitted light that passes only once therethrough.

In Fig. 13 I have indicated a modified lower element comprising an opaque reflecting backing 37 and a transparent layer 36 of glass or celluloid for example. The upper face of this layer 36 is corrugated and the peaks of the corrugations are colored to form filter lines 34. Lines of light sensitive photographic material are located in the hollows at 35. The emulsion may be applied to the corrugated plate and wiped off of the filter lines, the emulsion being left in the hollows. At Fig. 14 an opaque reflecting backing 40 has located directly thereon the filter lines 38. In the hollows are located strips or lines of the sensitive photographic material 39. Both of the modifications shown in Figs. 13 and 14 are difficult to produce cheaply with present methods of manufacture, but they possess the advantage that they may be used for direct contact printing from the color selection negative, that is,—without the interposition of the auxiliary screen indicated in Fig. 12, but with the filter lines and emulsion lines in direct contact with the image-bearing layer of the negative.

While in the illustration black and white and pure color tints are described for the sake of clearness, nevertheless half tones and mixed tints will be equally well reproduced as will be obvious.

It is to be understood that while in Fig. 12 the masking element is shown in front of the negative and in contact with the sensitized element, that this particular arrangement is not essential; it being necessary only that the masking element be so placed in registry with the lines of the filter as to shield them from the incident light.

Having thus described my invention what I claim as new and desire to scure by Letters Patent is:

1. A photographic element, comprising a support having thereon color filter areas interspersed with non-filter areas, the filter areas and non-filter areas being of the same order of magnitude, and photographic material sensitized to yield an opaque image, said support including a light-reflecting surface behind said areas and material.

2. A photographic element, comprising a support having thereon separated color filter areas interspersed with areas of photographic material sensitized to yield an opaque image; all filter areas on said support being of substantially the same color and said support including a light-reflecting surface behind said areas and material.

3. A photographic element, comprising a support having thereon both separated filter lines and light sensitive gelatino-silver emulsion, all lines on said support being of substantially the same color and said support embodying an opaque light-reflecting backing behind said lines and emulsion.

4. A photographic element comprising a support having thereon both photographic material sensitized to yield an opaque image and separated color areas, all of said color areas being of one color and said support including a light-reflecting surface behind said areas and material.

5. A photographic element comprising a support of translucid material backed by opaque light-reflecting material, spaced filter areas on the translucid material of said support, and light sensitive photographic material located on the translucid material of said support on the spaces between said filter areas.

6. In the process of printing from a negative onto an element comprising a support having thereon separated color filter areas and light sensitive photographic material, the steps of first interposing auxiliary masking areas between said element and negative, said masking areas being substantially coextensive with and shielding said filter areas and then transmitting printing light through said negative and between said masking areas to said sensitive photographic material.

7. In the process of printing from a negative onto an element comprising a support having on one face thereof separated color filter lines and light sensitive photographic material, said support including a light-reflecting surface behind the lines and material, the steps of first interposing between the negative and that face of the element bearing said lines and material a set of auxiliary masking lines substantially shielding said filter lines, and then transmitting printing light through said negative between said masking lines to said sensitive photographic material.

8. A photographic color picture comprising small separated areas of photographic material recording a color value of a subject in a broken image, each area of which is adjacent to and interspersed with small color areas complementary in color to that of the color value of the image, further separated areas of photographic material opposite said color areas and bearing separated image portions recording a color value similar to the color of said color areas and areas of color complementary to the other color areas opposite said first mentioned image portions and interspersed with the second mentioned areas of photographic material, whereby each image may be viewed through a filter similar in color to that of the color value of the subject represented in said image and the broken images may be associated in the eye as a complete color picture, and a support for said areas including a light-reflecting backing.

9. In the process of printing from a negative onto an element comprising a support having thereon separated color filter areas and light sensitive photographic material, the steps of interposing in front of said element the negative and a series of auxiliary masking areas, said masking areas being substantially coextensive with and shielding said filter areas and then transmitting light between said masking areas and through said negative to said sensitive photographic material.

Signed at Rochester, New York, this 14th day of July 1919.

RAY L. STINCHFIELD.